(12) United States Patent
Lee et al.

(10) Patent No.: US 6,293,019 B1
(45) Date of Patent: Sep. 25, 2001

(54) RATCHET CABLE CUTTER

(76) Inventors: Robert Lee, RR #1, Troy, Ontario (CA), L0R 2B0; Randall Vanlauwe, RR #1, Ayr, Ayr, Ontario (CA), N0B 1E0

( * ) Notice: Subject to any disclaimer, the term of this patent is extended or adjusted under 35 U.S.C. 154(b) by 0 days.

(21) Appl. No.: 09/524,979

(22) Filed: Mar. 14, 2000

Related U.S. Application Data

(60) Provisional application No. 60/124,845, filed on Mar. 17, 1999.

(51) Int. Cl.[7] .................................................. B26B 13/26
(52) U.S. Cl. .................................. 30/251; 30/92; 30/250
(58) Field of Search ............................... 30/92, 249, 250, 30/251, 252

(56) References Cited

U.S. PATENT DOCUMENTS

| | | | |
|---|---|---|---|
| 3,007,245 | * 11/1961 | Keiser, Jr. ............................... | 30/252 |
| 4,178,682 | 12/1979 | Sadauskas ............................... | 30/250 |
| 4,254,549 | * 3/1981 | McMullin ............................... | 30/251 |
| 4,443,941 | * 4/1984 | McPaul ................................... | 30/182 |
| 4,899,445 | * 2/1990 | Erbrick et al. .......................... | 30/251 |
| 5,184,404 | * 2/1993 | Chen ....................................... | 30/250 |

* cited by examiner

*Primary Examiner*—Hwei-Slu Payer
(74) *Attorney, Agent, or Firm*—Edward H. Oldham

(57) ABSTRACT

A cable cutting device having one handle of the cutter placed parallel and closely adjacent to the cable which is to undergo cutting. When a cable is about to be cut, the cable and the handle of the cutter are placed in a side by side relationship and both the cable and handle of the cutter are grasped by the user. The remaining handle is attached to a ratchet mechanism in the cutter and is oscillated to drive the cutter by means of a ratchet device to cut the cable which is still being grasped by the user. Now, the severed cable may be suitably disposed of in a controlled and safe manner. If the user is a utility lineman, the safety associated with the above operation cannot be overemphasized.

6 Claims, 4 Drawing Sheets

RATCHET CABLE CUTTER

This application claims benefit of Provisional No. 60/124,845 filed Mar. 17, 1999.

FIELD OF INVENTION

The device of this application is useful in cutting power cables. Cable cutting devices require a sizable mechanical advantage in order to sever large power cables. In order to keep the size of such a cutting tool to a reasonable size and yet have a large mechanical advantage, cutter manufacturers have universally resorted to the use of a ratchet mechanism to produce small advances of the cutter blade while the cutting tool handle moves through great distances.

BACKGROUND OF THE INVENTION

Utility linemen are frequently required to cut an end for a power cable, for instance during a cable splicing operation, where a pair of power cables must be cut to a desired length and spliced. In the past, the lineman really required three hands to safely cut a power cable and, yet maintain control of the severed end of the cable.

The reason for this is simple. The cutting tool had two handles, one of which was stationary and one of which was oscillated back and forth to ratchet the cutter blade toward an anvil or an opposing cutting blade. (Before widespread use of the ratchet mechanism was adapted, cutting tools originally had a pair of long handles which were held together at a pivot point and the mechanical advantage was determined by the ratio of the distance that the cutter mechanism and the handle pressure points were from the pivot.)

With the advent of the ratchet mechanism, the cutter handles continued to be located on the opposite side of the pivot from the cutting head, and usually only one handle was moved in an oscillatory manner to advance the ratcheting mechanism to close the cutter blade.

SUMMARY OF THE INVENTION

This invention provides improved overall safety when large electrical power cables must be cut. If, for some reason, a power cable some distance above ground must be trimmed or cut, in order to prepare the ends of a pair of cables for a splicing operation, at times prior art cutters made it almost impossible for a utility lineman to perform a cable cutting operation and not drop the severed end of the cable to the ground below.

Considerable thought has been directed to improving the mechanical leverage of prior art cutters, but little thought has been directed to improving the safety of the cutting operation. This invention makes it possible for a utility lineman to simultaneously hold the cable end (about to be severed) and one of the handles (the stationary one) of the cutter device with the same hand while the other hand is free to operate the pivoting handle of the cutter to advance the cutting blade.

PRIOR ART

U.S. Pat. No. 4,178,682

This patent is an excellent example of a prior art tool which has received wide commercial acceptance in the electrical utility industry. Basically, the tool provides a method of obtaining substantial mechanical advantage for performing a cutting operation while maintaining a compact size for the cutter itself. One of the handles is pivoted about a pivot point on the main housing to advance a cutter jaw by means of a ratchet mechanism to provide the required mechanical advantage necessary to cut large power cables.

DESCRIPTION OF THE PREFERRED EMBODIMENT

Figure 1:
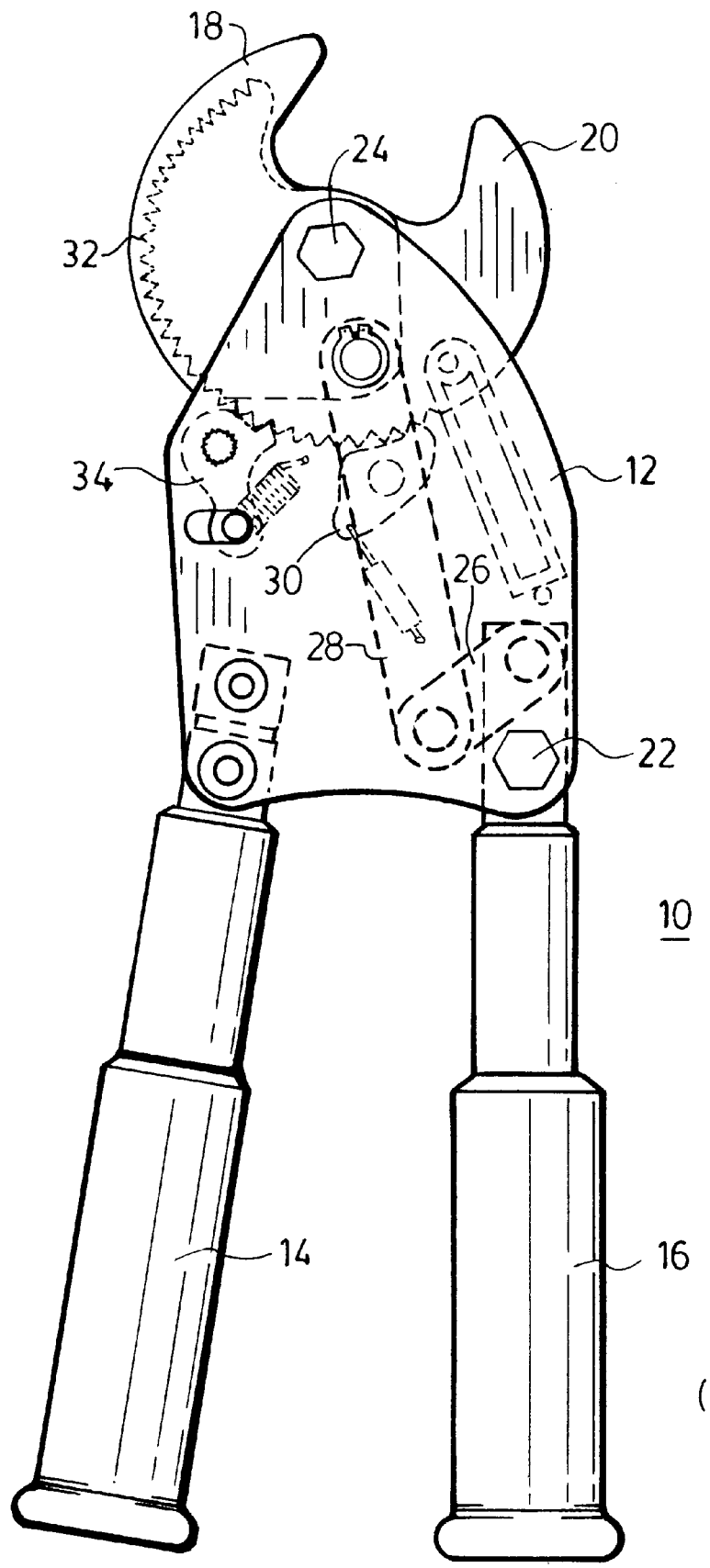
FIG. 1 represents a prior art ratchet cable cutter.

Referring now to the drawings and FIG. 1 in particular where a prior art cable cutter 10 is shown, it will be apparent to those skilled in the art that this cable cutting device is a representative type of cable cutter widely used in industry. Cutter 10 has a housing 12 which serves to mount handles 14 and 16 and cutter jaws 18 and 20 therein. Handle 16 and jaw 20 are mounted on pivots 22 and 24 so as to provide the necessary motion to power the device 10 and sever a cable.

Pivoting handle 16 is connected to link 26 which in turn is connected to a pair of ratchet levers 28 between which pivots pawl 30 which engages the teeth of ratchet 32 of pivoting cutter blade 20. A detent 34 serves to hold the cutter blade 20 in its ratcheted position.

As handle 16 is swung back and forth about pivot 22, the cutter blade 20 is ratcheted toward stationary cutter 18 so as to cut a cable which is placed in the opening between the cutter jaws 18 and 20. When the cable is severed, detent 34 may be activated to disengage the teeth of ratchet 32 to release the jaw 20 and allow it to pivot to the open position.

The cutting action of cutter 10 is well understood by utility personnel and the compactness of the device allows the use of the device in cramped areas where use of longer handled devices would be impossible. (See U.S. Pat. No. 4,178,682 for a more detailed explanation.) But the use of the cutter 10 requires a worker to grasp both handles 14 and 16 and pull handle 16 toward handle 14 to advance the ratchet 32 one tooth at a time. Detent 34 holds the jaw 20 in die advanced position until handle 16 moves the jaw 20 one more notch to the closed position. If a cable is being cut, the severed end of the cable is free to fall freely from device 10.

Figure 2:
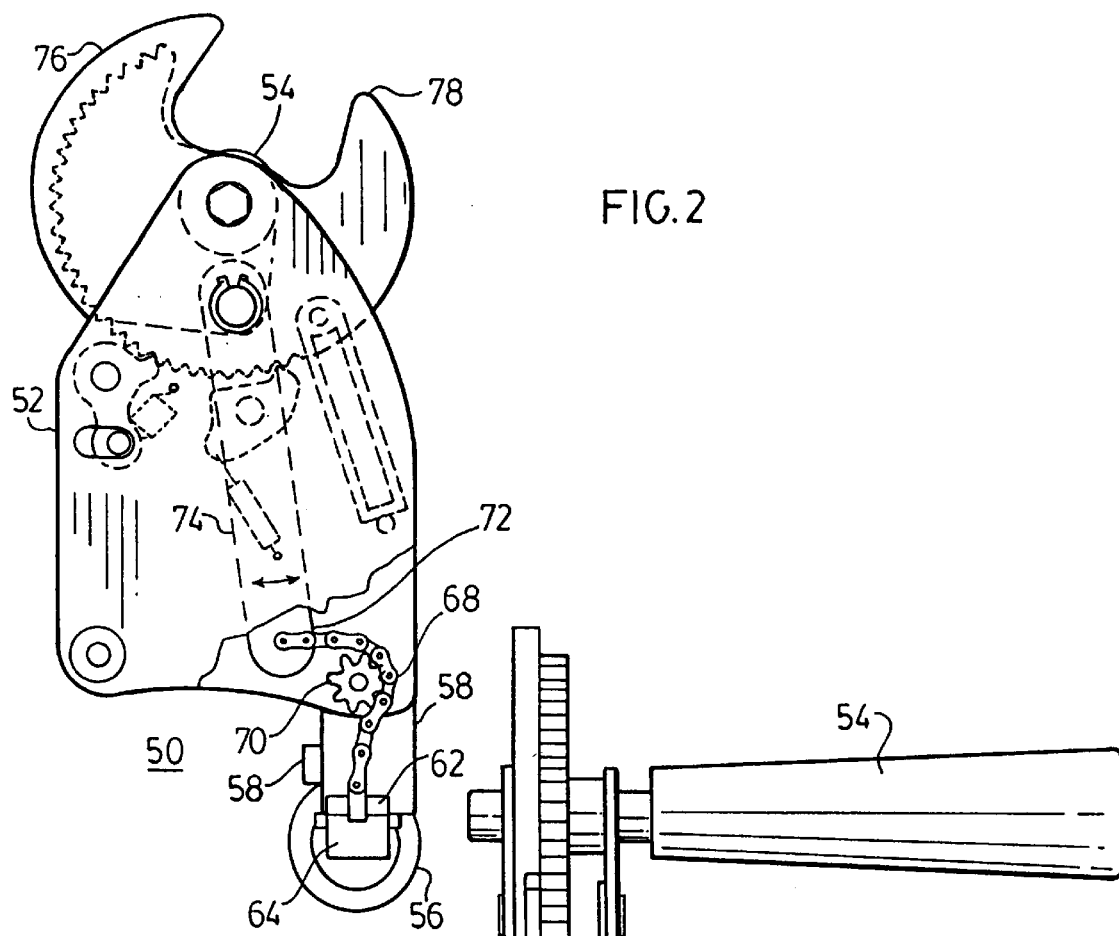
FIG. 2 shows a frontal view of the device of this invention.
Figure 3:
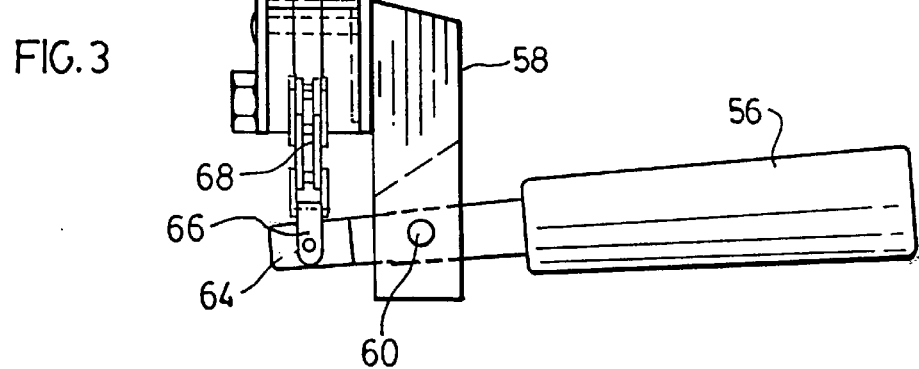
FIG. 3 is a side view of the device of FIG. 2.

FIGS. 2 and 3 show a device 50 which is capable of performing the same ratcheted cutting action of a cable as the device shown in FIG. 1 but with an important modification.

Device 50 is provided with a housing 52 on which is mounted a pair of handles 54 and 56, handle 54 stationary and handle 56 pivoting, to energize cutter 50. Handle 56 pivots in boss 58 about pivot 60 within slot 62.

Handle 56 is provided with extension 64 to which a pivot link 66 is pivotally attached.

A roller chain 68 is attached to pivot link 66 and is passed over sprocket 70 and is attached to the end 72 of ratchet lever 74.

Ratchet levers 74 functions in exactly the same manner as levers 28 of device 10 of FIG. 1. As handle 56 is pivoted about pivot 60, chain 68 oscillates back and forth to cause levers 74 to pivot back and forth to advance jaw 78 toward jaw 76 to cut a cable.

Figure 4:
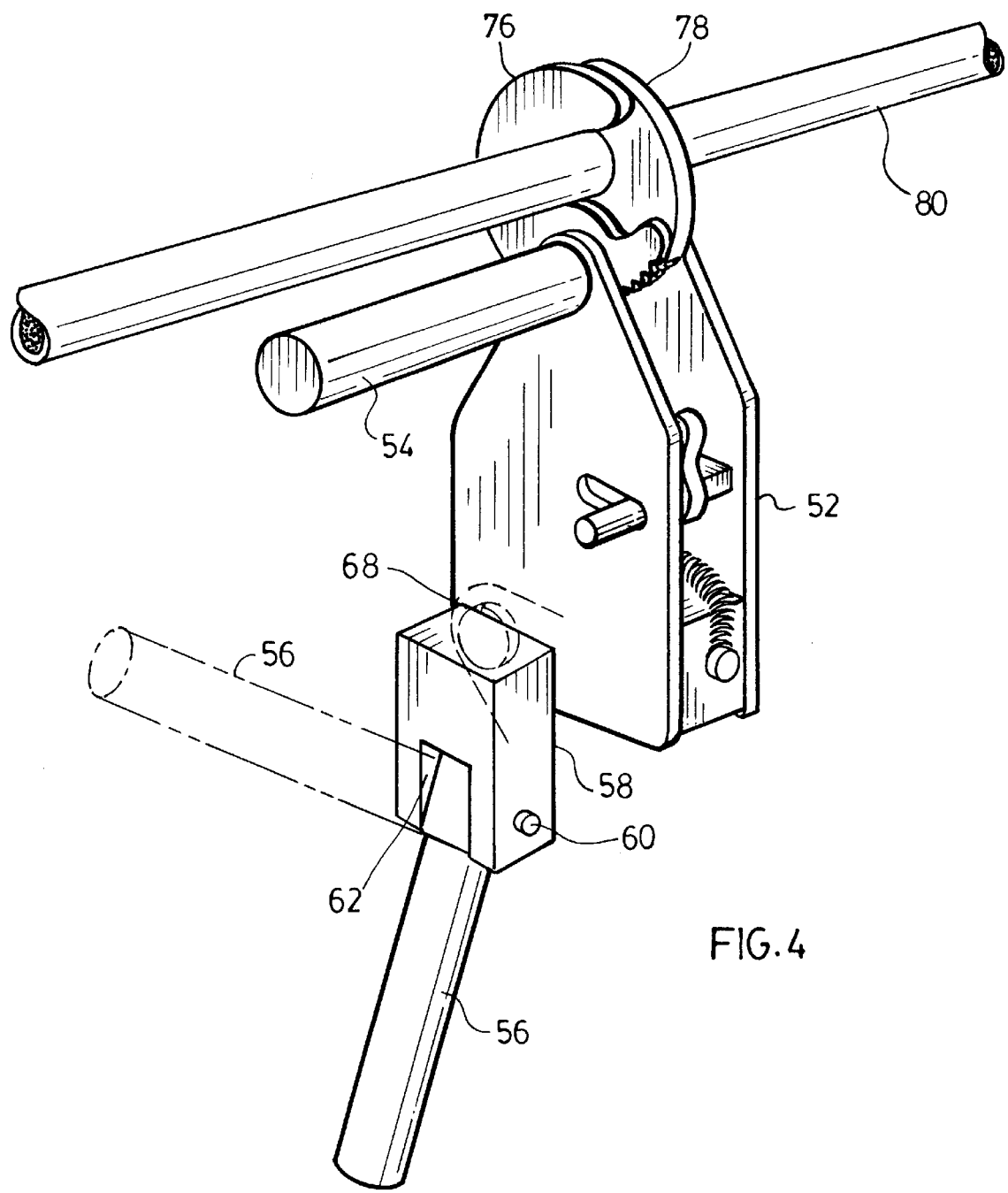
FIG. 4 is a perspective of the device of this invention being used to sever a cable.

Handles 54 and 56 are now located in a plane which is parallel to the plane of cable 80 being severed in FIG. 4. Handle 54, in this instance, is located in the pivot axis of jaw 76 so that it is substantially parallel to cable 80. The handle 56, chains 68 and sprocket 70 serve to pivot the levers 74 in the same manner that handle 16, link 26 and pivot levers 28 to ratchet jaw 20 toward jaw 18 in FIG. 1.

Figure 5:
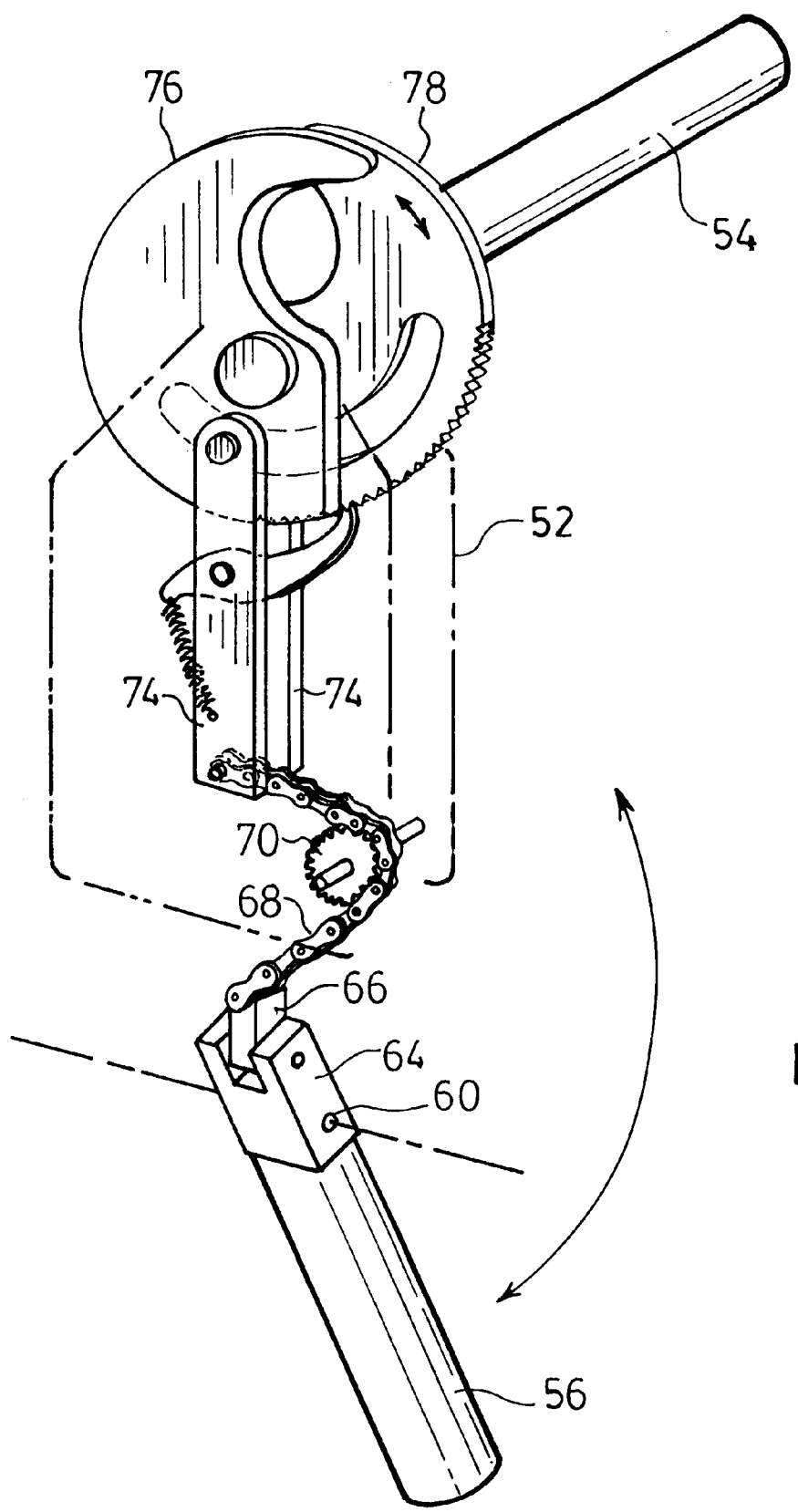
FIG. 5 is an illustration to show the cutting action of the device of FIG. 2.

FIG. 5 shows an unrestricted view of the mechanism used to ratchet jaw 78 toward jaw 76.

The cutting action of the device of FIGS. 2–5 obtains the same mechanical advantage as the prior art device shown in FIG. 1. The handles are strategically placed to allow the user to now grasp both the handle 54 and cable 80 with the same hand. The remaining hand may be used to oscillate handle 56 about pivot 60 in boss 58 to advance the cutter 78 toward cutter 76. When cable 80 is severed, the free end will be held firmly by the utility worker's hand which is grasping both the handle 54 and the cable end.

The utility worker may now control where the severed end of cable 80 falls after such a cutting operation. This is extremely important if the user is a utility lineman working at substantial height where live line conductors may be in the vicinity and utility workers may be moving on the ground below.

The safety associated with the capture of the severed end of the cable cannot be overemphasized.

Applicant has chosen to use a chain and sprocket to oscillate levers 74 but other forms of actuation for levers are immediately obvious i.e. hydraulic fluid pressure transferred from handle 56 to levers 74, by master and slave cylinders etc. The transfer mechanism used to advance jaw 78 toward jaw 76 is oily a small part of this invention; the important feature is that handle 54 is parallel and adjacent to the cable undergoing the severing operation. Handle 54 may be provided with an axial recess of the surface thereof to allow the cable 80 to fit into the recess in handle 54 for convenience of the utility worker.

Although the description of applicants' device has been restricted to use as a cable cutter, other applications of applicants' device will become apparent to those skilled in the art i.e. tree pruning devices and sleeve compressing devices used in splicing cables etc.

The other modifications above will be immediately apparent to those skilled in the art one applicants' device has been disclosed however, applicants prefer to limit the scope of the invention by the following claims.

What is claimed is:

1. A ratchet cable cutter comprising, in combination, a housing having a stationary handle and a stationary blade mounted thereon, a ratchet blade rotatably mounted on pivot means in said housing for rotation about a pivot axis, a driving handle rotatably mounted on said housing, whereby said driving handle can swing back and forth toward and away from said stationary handle during a cutting operation, at least one ratchet drive lever rotatably mounted in said housing, whereby said ratchet drive lever swings back and forth in a small arc within said housing, a pawl rotatably mounted on said ratchet drive lever so as to engage said ratchet blade to rotate said ratchet blade forward, a detent rotatably mounted in said housing so as to engage said ratchet blade to prevent backward rotation of said ratchet blade, and connecting means for connecting said driving handle to said ratchet drive lever to cause said ratchet drive lever to move in concert with said driving handle, and wherein said stationary handle is mounted on said housing on said pivot axis.

2. A ratchet cable cutter as claimed in claim 1 wherein said driving handle is connected to said ratchet lever by a chain.

3. A ratchet cable cutter comprising, in combination, a stationary frame assembly having a stationary blade and a stationary handle assembly, a ratchet blade rotatably supported about a pivot axis in said frame assembly, a driving handle assembly rotatably supported upon said frame assembly, a drive lever rotatably supported upon said frame assembly, a pawl rotatably supported upon said drive lever in cooperative relationship with said ratchet blade to drive said ratchet blade forward, a detent rotatably supported upon said frame assembly in cooperative relationship with said ratchet blade to restrain backward movement of said ratchet blade, and a motion transfer mechanism mounted between said driving handle assembly and said drive lever, wherein said handle assemblies are mounted on said frame assembly in a plane parallel to said pivot axis.

4. A cable cutter as claimed in claim 3 for cutting a cable and wherein the stationary handle assembly is mounted on said frame adjacent said cable being cut.

5. A ratchet cutter comprising a housing for mounting a stationary blade and a stationary handle thereon, a ratchet blade rotatably supported in said housing and a driving handle assembly rotatably supported on said housing to ratchet said ratchet blade toward said stationary blade, wherein said stationary handle and said driving handle assembly are located in a plane parallel to the pivot axis of said rotatable ratchet blade.

6. A ratchet cutter as claimed in claim 5 wherein said stationary handle extends along said pivot axis of said rotatable ratchet blade.

* * * * *